United States Patent
Belfiore

(10) Patent No.: US 12,322,035 B2
(45) Date of Patent: Jun. 3, 2025

(54) THREE-DIMENSIONAL PERSPECTIVE CORRECTION

(71) Applicant: Scale AI, Inc., San Francisco, CA (US)

(72) Inventor: Rodrigo Belfiore, Buenos Aires (AR)

(73) Assignee: Scale AI, Inc., San Francisco, CA (US)

( * ) Notice: Subject to any disclaimer, the term of this patent is extended or adjusted under 35 U.S.C. 154(b) by 71 days.

(21) Appl. No.: 17/963,935

(22) Filed: Oct. 11, 2022

(65) Prior Publication Data

US 2024/0119661 A1 Apr. 11, 2024

(51) Int. Cl.
*G06T 15/20* (2011.01)
*G06T 7/50* (2017.01)
*G06T 7/62* (2017.01)
*G06T 7/70* (2017.01)
*G06T 19/20* (2011.01)

(52) U.S. Cl.
CPC ............. *G06T 15/205* (2013.01); *G06T 7/50* (2017.01); *G06T 7/62* (2017.01); *G06T 7/70* (2017.01); *G06T 19/20* (2013.01); *G06T 2200/24* (2013.01); *G06T 2207/20092* (2013.01); *G06T 2210/12* (2013.01); *G06T 2219/2016* (2013.01)

(58) Field of Classification Search
CPC ........... G06T 15/205; G06T 7/62; G06T 7/50; G06T 7/70; G06T 15/20; G06T 19/20; G06T 2200/24; G06T 2207/20092; G06T 2210/12; G06T 2219/2016
See application file for complete search history.

(56) References Cited

U.S. PATENT DOCUMENTS

| | | |
|---|---|---|
| 10,936,902 B1 | 3/2021 | Bagwell et al. |
| 2012/0328196 A1 | 12/2012 | Kasahara et al. |
| 2015/0178943 A1* | 6/2015 | Li .......................... H04N 23/63 382/103 |
| 2016/0012611 A1 | 1/2016 | Wexler et al. |
| 2018/0113596 A1* | 4/2018 | Ptak .................... G06F 3/04815 |
| 2021/0314551 A1 | 10/2021 | Tang et al. |

OTHER PUBLICATIONS

International Search Report for Application No. PCT/US2023/34848 dated Jan. 11, 2024.
International Preliminary Report on Patentability, PCT/US2023/034848, The International Bureau of WIPO, dated Apr. 24, 2025, 7 pages.

* cited by examiner

*Primary Examiner* — Antonio A Caschera
(74) *Attorney, Agent, or Firm* — Squire Patton Boggs LLP; Sarah Mirza

(57) ABSTRACT

Embodiments of the present disclosure set forth techniques for three-dimensional perspective correction, where the techniques include receiving a first image that depicts an object from a first perspective along a first axis; determining a location of the object along the first axis; determining, based on the first image and the location of the object along the first axis, at least one dimension of the object; and adjusting, based on the at least one dimension of the object, a second image that depicts the object from a second perspective along a second axis. In some embodiments, adjusting the second image comprises skewing at least a portion of the second image to depict the object from a third perspective along a third axis.

15 Claims, 15 Drawing Sheets

THREE-DIMENSIONAL PERSPECTIVE CORRECTION

BACKGROUND

Technical Field

Embodiments of the present disclosure relate generally to image processing and, more specifically, to three-dimensional perspective correction.

Description of the Related Art

In various computing scenarios, operations are performed on an image to determine information about objects captured by the image. For example, a device can present, for a user, a graphical user interface including the image. The user can provide user input that indicates a location of an object in the image or a bounding shape around the object in the image, such as a 3D bounding box (also referred to herein as a cuboid) that encloses the object. Based on the user input and the indicated information, additional operations can be performed involving the object, such as classifying the object as an object type; determining a dimension of the object; determining a location and/or orientation of the object within the environment depicted in the first image; or determining a bounding shape of the object.

One drawback of the above technique is that the image can be insufficient to determine the information necessary to perform the additional operations involving the object. In one scenario, determining one or more dimensions of the object in an image based on only the bounding shape provided by the user input might not be possible. In particular, the dimensions of the object can be estimated, but inaccuracies in the estimates might be apparent only when applying the estimated dimensions of the object in other operations. For example, when another image of the object is adjusted to compensate for a perspective of the object in the other image, inaccuracies in the estimates of the dimensions of the object can disproportionately scale the object, resulting in images in which the object is too small or too large.

As the foregoing illustrates, what is needed in the art are improved techniques for three-dimensional perspective correction.

SUMMARY

In some embodiments, a computer-implemented method includes receiving a first image that depicts an object from a first perspective along a first axis; determining a location of the object along the first axis; determining, based on the first image and the location of the object along the first axis, at least one dimension of the object; and performing, based on the at least one dimension of the object, one or more perspective adjustment operations on a second image that depicts the object from a second perspective along a second axis.

At least one technical advantage of the disclosed techniques is an improved accuracy of information determined about the object in the first image, such as one or more dimensions of the object and/or a bounding shape of the object. The accuracy of determined information about the object can improve the accuracy of additional operations performed on images of the object, such as determining the location and/or bounding shape of the object in additional images along different axes. As another technical advantage, the techniques can adjust a bounding shape that encloses an object in one image to another image from a different perspective or point of view. As a result, locations of a moving object can be accurately determined over multiple images that depict the object at different locations. As another technical advantage, the techniques enable new types of operations on images of an object that might otherwise be difficult to perform with acceptable results. For example, given an image that shows a lateral view of an object and an indication of a distance of the object from the viewing location, the techniques can generate a new image that depicts an overhead view of the object. These technical advantages provide one or more technological improvements over prior art approaches.

BRIEF DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

DETAILED DESCRIPTION

In the following description, numerous specific details are set forth to provide a more thorough understanding of the various embodiments. However, it will be apparent to one skilled in the art that the inventive concepts may be practiced without one or more of these specific details.

Figure 1:
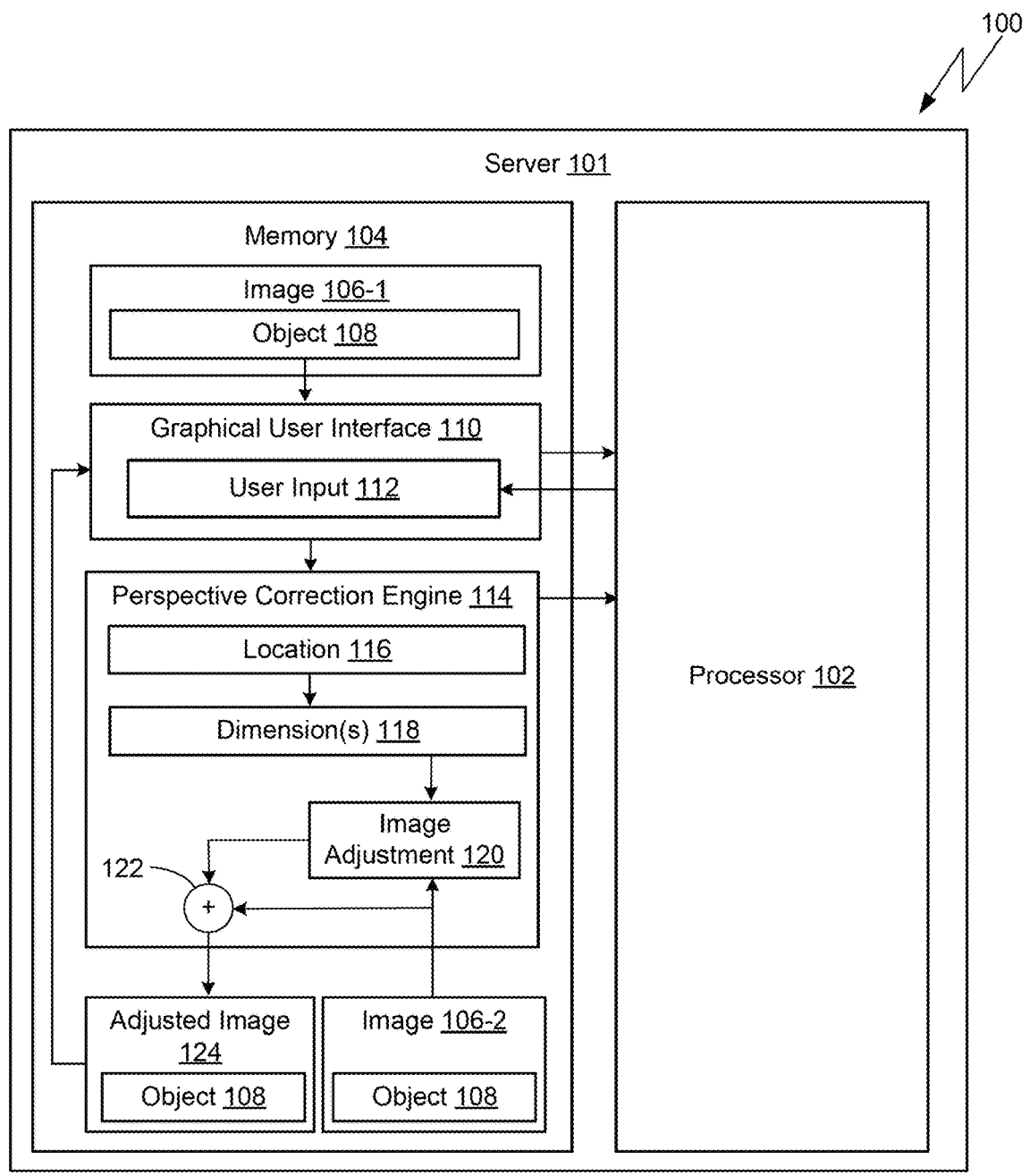
FIG. 1 is a system configured to implement one or more embodiments.

FIG. 1 is a system 100 configured to implement one or more embodiments.

As shown, a server 101 within system 100 includes a processor 102 and a memory 104. The memory 104 includes two images 106-1, 106-2 that depict an object 108, a graphical user interface 110, and a perspective correction engine 114. Each of the images 106-1, 106-2 shows the object 108 from a different perspective or point of view. In various embodiments, the images 106-1, 106-2 are different still images captured by a camera from different points of view, or different still images captured by different cameras located at different points of view, or different frames of a video that shows the object from different points of view. That is, each image 106-1, 106-2 shows the object 108 from a point of view along a different axis, where each axis comprises a line between the object 108 and a location of the camera that captured the image 106. For example, the image 106-1 can show a view of the object 108 from one side, and the image 106-2 can show a view of the object 108 from another side. In various embodiments, the server 101 includes a camera that captures the image 106-1 of the object 108. Alternatively or additionally, in various embodiments, the server 101 receives the image 106-1 of the object 108 from another device, such as an external camera or another computer that includes a camera.

The graphical user interface 110 is a program stored in the memory 104 and executed by the processor 102 to show images 106 to a user and to receive user input 112 based on the image 106. The graphical user interface 110 presents one of the images 106-1 to the user. In various embodiments, the graphical user interface 110 includes the image 106-1 depicting the object 108 and a set of user controls that enable the user to provide user input 112. The user input 112 can include an indication of a location of the object 108 in the image 106-1, such as a coordinate of the image 106-1. The user input 112 can include a bounding shape drawn around the image, such as a two-dimensional shape like a circle or rectangle, or a three-dimensional shape like a cuboid. The user input 112 can also include an indication of a location of the object 108 along an axis, such as a line between the object 108 and the camera that captured the image 106-1. In various embodiments, the graphical user interface 110 includes a slider control that allows the user to indicate the location along the axis as a distance of the object 108 from the camera.

The perspective correction engine 114 is a program stored in the memory 104 and executed by the processor 102 to correct a perspective of images of the object 108 and/or a bounding box in the image that surrounds the object 108. The perspective correction engine 114 receives the location 116 of the object 108 from the graphical user interface 110. Based on the image 106-1 and the user input 112, the perspective correction engine 114 determines one or more dimensions 118 of the object 108. The one or more dimensions 118 can include one or more physical dimensions 118 of the object 108, such as a length, a width, and/or a height. As an example, the processor 102 can determine a length of the object 108 in the image 106-1, such as a number of pixels along a horizontal axis of the image 106-1, and can scale the length of the object 108 based on a distance between the location of the object 108 and the location of the camera. The one or more dimensions 118 can include one or more dimensions of a bounding shape that includes the object 108, such as a length, a width, a height of a cuboid that encloses the object 108. The one or more dimensions 118 can include one or more dimensions of an orientation of the object 108, such as a pitch, a roll, and/or a yaw of the object 108 with regard to an axis of the image 106.

The perspective correction engine 114 receives another image 106-2 of the object 108 from a different perspective. In various embodiments, the server 101 includes a camera that captures the image 106-2 of the object 108. Alternatively or additionally, in various embodiments, the server 101 receives the image 106-2 of the object 108 from another device, such as an external camera or another computer that includes a camera. The other device can be the same device from which the server 101 received the previous image 106-1 or a different device.

The perspective correction engine 114 determines an image adjustment 120 of the image 106-2 based on the determined one or more dimensions 118 of the object 108. The image adjustment 120 can include a depiction of a bounding shape around the object 108 in the image 106-2 that is based on the determined one or more dimensions 118 of the object 108. The image adjustment 120 can also include a skewing of at least a portion of the image 106-2 that changes a perspective or point of view of the image 106-2 to a different location, such as changing a side view of the object to an overhead view of the object 108. The perspective correction engine 114 applies 122 the image adjustment 120 to the image 106-2 to generate an adjusted image 124.

In various embodiments, the perspective correction engine 114 can perform perspective correction in an iterative manner. For example, after generating the adjusted image 124, the perspective correction engine 114 can cause the graphical user interface 110 to show the adjusted image 124 to the user. The adjusted image 124 can include the image 106-2 with a bounding shape drawn around the object 108, such as a cuboid. The graphical user interface 110 can receive additional user input 112 from the user that adjusts the location 116 of the object 108 in the previously shown image 106-1. Based on the additional user input 112, the perspective correction engine 114 can update the determined one or more dimensions 118 of the object 108. The perspective correction engine 114 can apply another image adjustment 120 to the image 106-2 to generate another adjusted image 124, and can show the another adjusted image 124 to the user through the graphical user interface 110.

Some embodiments of the disclosed techniques include different architectures than as shown in FIG. 1. Various embodiments can include various types of processors 102, such as a CPU, a GPU, a TPU, an ASIC, or the like. Some embodiments include two or more processors 102 of a same or similar type (e.g., two or more CPUs of the same or similar types). Alternatively or additionally, various embodiments include processors 102 of different types (e.d., two CPUs of different types; one or more CPUs and one or more GPUs or TPUs; or one or more CPUs and one or more FPGAs). In some embodiments, two or more processors 102 perform different parts of the disclosed techniques (e.g., one processor 102 executes the graphical user interface 110 to show images 106 to the user and receive user input 112, and another processor 102 executes the perspective correction engine 114 to correct a perspective of the images based on the user input 112). Alternatively or additionally, in various embodiments, two or more processors 102 perform a part of the disclosed techniques in tandem (e.g., two or more processors 102 that operate in tandem to apply an image adjustment 120 to different portions of an image 106).

As a second such example and without limitation, various embodiments include various types of memory 104. Some embodiments include two or more memories 104 of a same or similar type (e.g., a Redundant Array of Disks (RAID) array). Alternatively or additionally, some embodiments include two or more memories 104 of different types (e.g., one or more hard disk drives and one or more solid-state storage devices). In some embodiments, one memory 104 stores a first component (e.g., one or more images 106 of the object 108) and another memory 104 stores a second component (e.d., programs including graphical user interface 110 and/or the perspective correction engine 114).

As a third such example and without limitation, instead of one server 101, some disclosed embodiments include two or more servers 101 that together apply the disclosed techniques. In various embodiments, two or more servers 101 execute different parts of one operation (e.g., two servers 101 that operate in tandem to apply an image adjustment 120 to different portions of an image 106). In various embodiments, two or more servers 101 each perform different operations (e.g., one server 101 that presents a graphical user interface 110 to a user and receives user input 112, and another server 101 that executes the perspective correction engine 114 to apply image adjustments 120). In various embodiments, two or more servers 101 communicate through a localized connection, such as through a shared bus or a local area network. Alternatively or additionally, in various embodiments, two or more servers 101 communicate through a remote connection, such as the Internet, a virtual private network (VPN), or a public or private cloud.

Figure 2A:
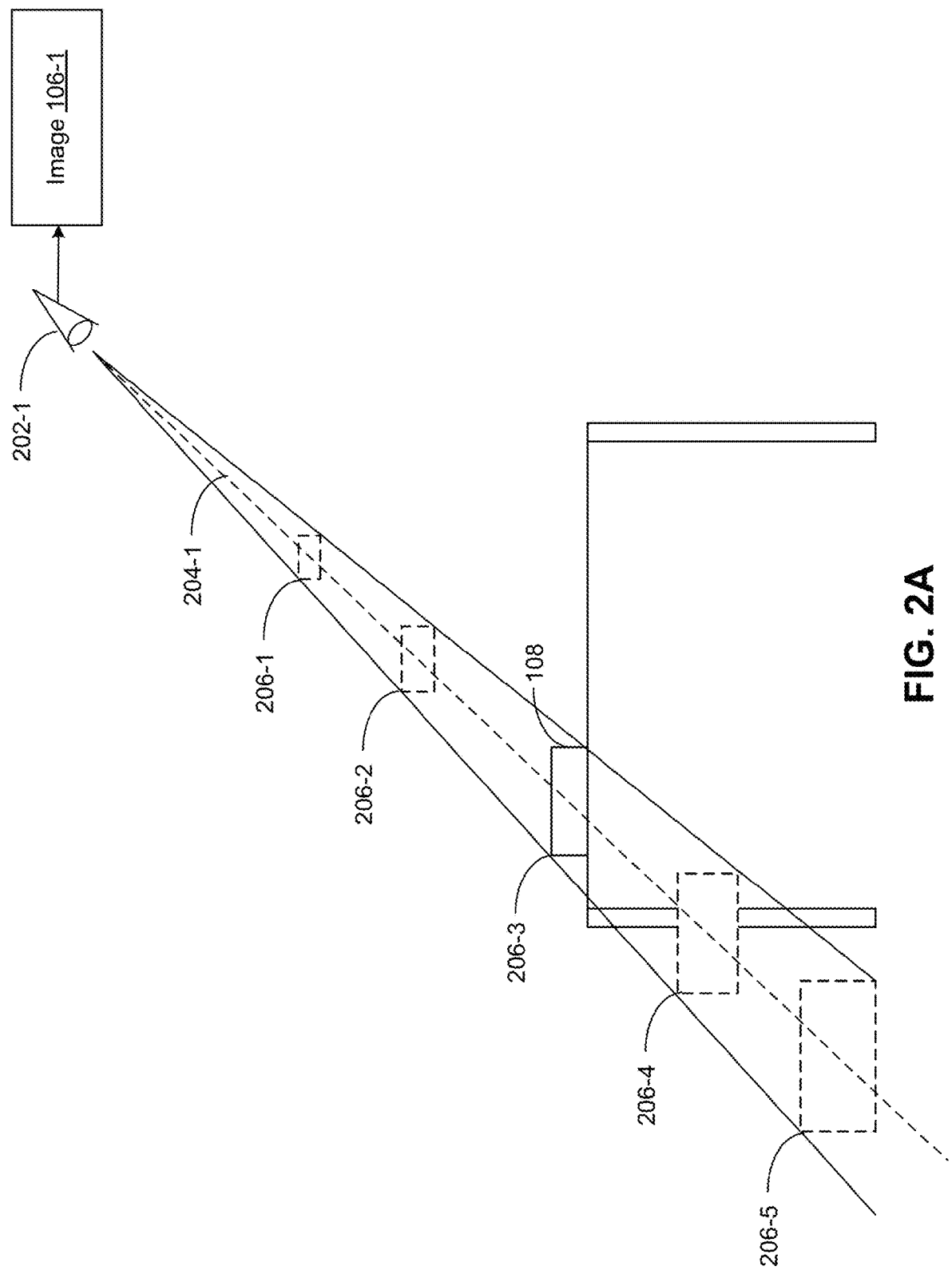
FIGS. 2A-B together illustrate a determination of one or more dimensions of an object in an image by the perspective correction engine of FIG. 1, according to one or more embodiments.
Figure 2B:
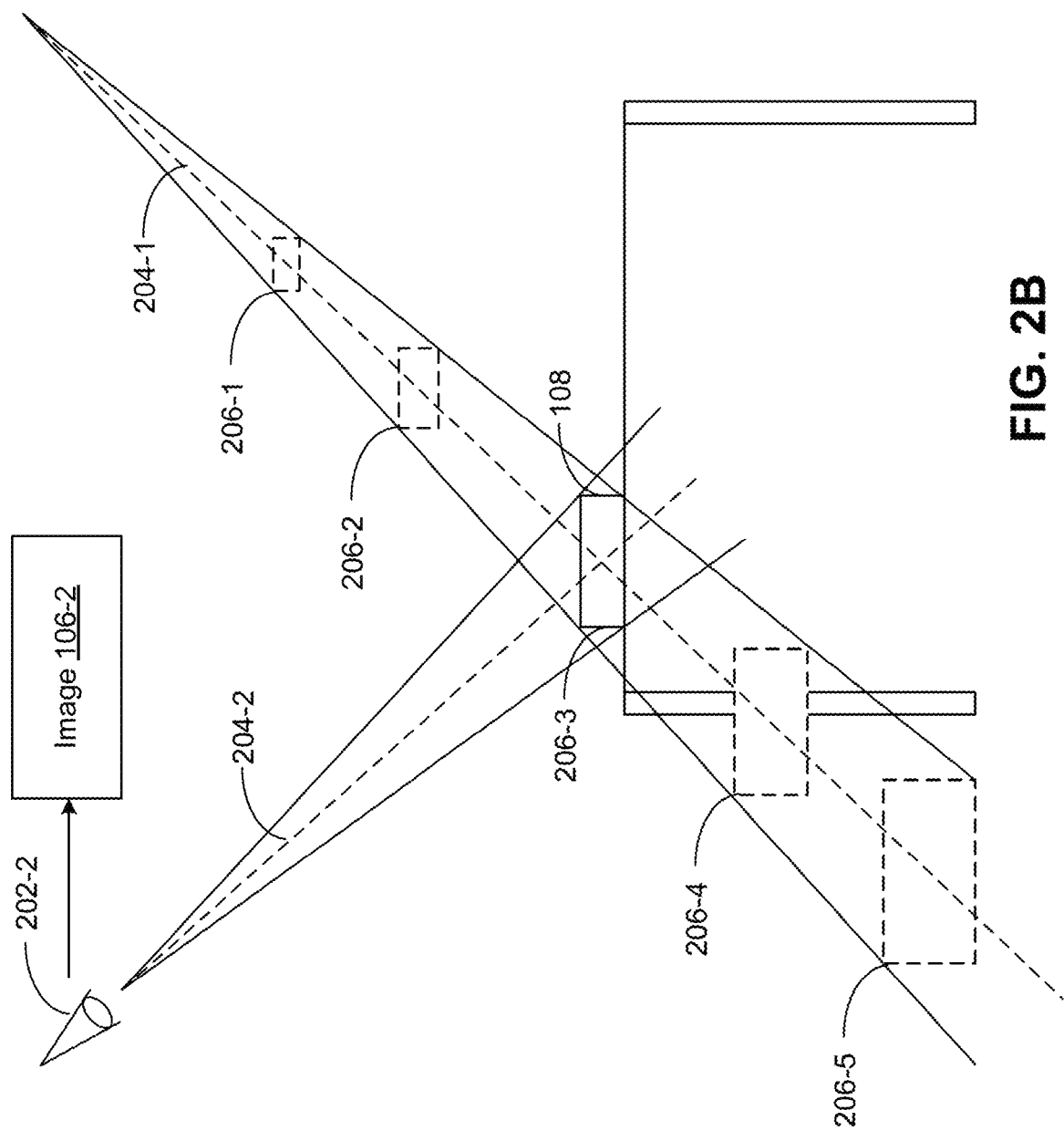

FIGS. 2A-2B together illustrate a determination of one or more dimensions of an object in an image by the perspective correction engine of FIG. 1, according to one or more embodiments. FIG. 2A illustrates an image 106-1 along an axis 204-1 that includes the object 108 and a point of view 202-1, such as the location of a camera, as shown in FIG. 2A. FIG. 2B illustrates a determination of the location of the object 108 of FIG. 2A along the axis 204-1 based on another image 106-2 along another axis 204-2 that includes the object 108 and a different point of view 202-2.

As shown, the image 106-1 depicts an object 108 from a point of view 202-1, such as an object that is resting on a tabletop or other surface. Based on the image 106, the perspective correction engine 114 can determine one or more logical measurements of the object 108, such as the number of pixels along a length or width of the object 108. The perspective correction engine 114 can also apply operations to the image 106-1, such as determining a bounding shape (e.g., a two-dimensional rectangle or a three-dimensional cuboid) of the object 108 within the image 106. However, the apparent size of the object 108 in the image 106-1 scales proportionally to the distance of the object 108 from the point of view 202. As a result, the image 106-1 does not contain enough information for the perspective correction engine 114 to determine one or more dimensions 118 of the object 108 based on the logical measurements of the object 108 in the image 106-1. For example, the image 106-1 could depict a smaller object 108 at a location 206-1 that is close to the point of view 202, or a larger object 108 at a location 206-5 that is far from point of view 202. That is, objects 108 of different dimensions 118 positioned at different locations 206, such as 206-1 to 206-5, could result in images 106 with identical or at least similar logical measurements. For example, if the location 206-1 of the object 108 is close to the point of view 202, a width dimension of the object 108 might be three centimeters. If the location 206-5 of the object 108 that is far from the point of view 202, the width dimension of the object 108 might be 14 centimeters. Due to the lack of information as to the location 206 of the object 108 along the axis 204-1, the perspective correction engine 114 might be unable to determine one or more dimensions 118 of the object 108 based only on the contents of the image 106-1.

FIG. 2B illustrates a determination of the location of the object 108 along the axis 204-1 based on another image 106-2 along another axis 204-2 that includes the object 108 and a different point of view 202-2. Based on the location of the object 108 along the axis 204-1, the perspective correction engine of FIG. 1 can determine one or more dimensions of the object.

In order to determine one or more dimensions 118 of the object 108, the perspective correction engine 114 presents another image 106-2 of the object 108 from a different perspective or point of view 202-2, such as a different location of the camera. That is, an axis 204-2 connecting the object 108 and the point of view 202-2 of the image 106-2 in FIG. 2B is different than the axis 204-1 connecting the object 108 and the point of view 202-1 of the image 106-1 in FIG. 2A. Unlike the image 106-1 in FIG. 2A, the image 106-2 in FIG. 2B would include different depictions of the object 108 at different locations 206 along the axis 204-1. That is, unlike the image 106-1 in FIG. 2A, objects 108 of different dimensions 118 positioned at different locations 206 would result in different images 106 from the different view 202-2 shown in FIG. 2B.

The graphical user interface 110 can receive, from a user, an indication of a location 206 of the object 108 along the axis 204-1. For example, the graphical user interface 110 can show the image 106-2 of FIG. 2B with different bounding shapes (e.g., cuboids) that correspond to different locations 206 of the object 108 along the axis 204-1 of the image 106-1 of FIG. 2A. The graphical user interface 110 can receive, from the user, user input that indicates a location 206 of the object 108 along the axis 204-1 that the user believes to be correct, such as a location 206 at which a corresponding displayed cuboid encloses the object in the image 106-2. Based on the indicated location 206, the perspective correction engine 114 can determine one or more dimensions 118 of the object 108. The perspective correction engine 114 can use the one or more dimensions 118 of the object 108 to correct a perspective of the object 108 in an image 106, as discussed in detail below.

Figure 3A:
FIG. 3A is an illustration of an image of an object presented by the graphical user interface of FIG. 1, according to one or more embodiments.

FIG. 3A is an illustration of an image 106-1 of an object 108 presented by the graphical user interface 110 of FIG. 1, according to one or more embodiments. The graphical user interface can receive user input 112 that indicates a cuboid 304-1 enclosing the object 108 in the image 106.

As shown, an image 106-1 includes an object 108 in an environment, such as a wireless headphones resting on a tabletop 302. The image 106-1 is captured from a point of view 202 (e.d., a location of a camera that is above and beside the tabletop 302). While not shown, an axis 204 is defined by a line connecting the object 108 and the point of view 202, such as shown in FIGS. 2A and 2B. The object 108 has an apparent size in the image 106-1, and logical measurements of the object 108 can include a number of pixels along a length, width, and/or height of the object 108 within the image 106-1. The graphical user interface 110 can annotate the image 106-1 based on the logical measurements, such as drawing a cuboid 304-1 around the object 108. The cuboid 304-1 can include a logical size (e.g., a number of pixels in length, width, and height) and orientation (e.g., a pitch angle, yaw angle, and/or roll angle) of a volume enclosing the object 108 within the three-dimensional space shown in the image 106-1. In various embodiments, the graphical user interface 110 includes one or more user controls that receive user input 112 by which a user can draw a cuboid 304-1 around the object 108. Alternatively or additionally, in various embodiments, the perspective correction engine 114 can estimate a cuboid 304 that encloses the object 108 within the three-dimensional space shown in the image 106-1.

However, a graphical user interface 110 might have difficulty determining one or more dimensions of the object 108 based only on the image 106-1 and corresponding logical measurements. For example, in the image 106-1 of FIG. 3A, the object 108 might have a particular size and might be resting on the tabletop 302, or the object 108 might have a smaller size and might be located above the tabletop 302 and closer to the point of view 202. Because the image 106-1 does not include enough information to determine the location 206 of the object 108 along the axis 204-2, the graphical user interface 110 cannot determine one or more dimensions 118 of the object 108. That is, the graphical user interface 110 can determine the cuboid 304-1 according to logical measurements of the image 106-1 (e.g., a number of pixels along a length, width, and/or height of the object 108 or the cuboid 304-1 enclosing the object 108), but cannot translate the logical measurements to corresponding one or more dimensions 118 of the three-dimensional space shown in the image 106-1. As a result, the graphical user interface 110 might have difficulty relating the cuboid 304-1 of the object 108 in the image 106-1 to cuboids 304 in other images 106 of the object 108.

Figure 3B:
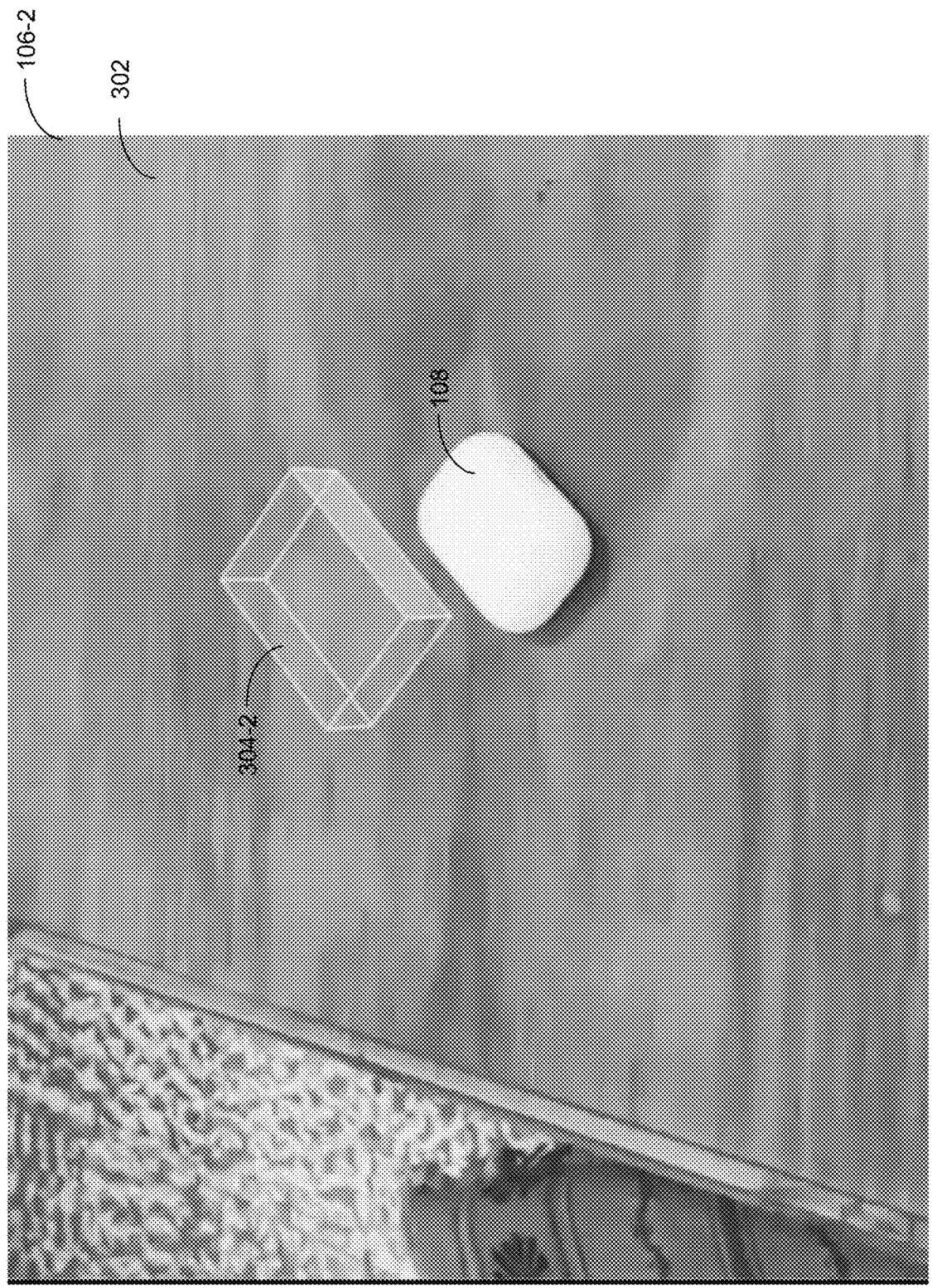
FIG. 3B is an illustration of another image of the object presented by the graphical user interface of FIG. 1, according to one or more embodiments.

FIG. 3B is an illustration of another image 106-2 of the object 108 presented by the graphical user interface 110 of FIG. 1, according to one or more embodiments. The image 106-2 can depict the same object 108 as the image 106-1 shown in FIG. 3A.

As shown, an image 106 includes another image of the object 108 shown in FIG. 3A, but from a different perspective or point of view 202. For example, the wireless mouse might have been moved across the tabletop 302 to a different position that is farther from the point of view 202. The graphical user interface 110 might attempt to translate the cuboid 304-1 determined in FIG. 3A to the image 106 of FIG. 3B. For example, based on a comparison of the image 106 of FIG. 3A and the image 106 of FIG. 3B, the graphical user interface 110 might estimate a movement distance of the object 108, that is, a distance that the object 108 has moved a certain distance across the tabletop 302. Further, based on an estimate of one or more dimensions 118 of the object 108 in the image 106-1 of FIG. 3A, the graphical user interface 110 might generate the cuboid 304-2 for the image 106-2 that is displaced proportionally to the estimated movement distance. However, because the images 106 shown in FIGS. 3A and 3B do not include enough information to determine the dimensions 118 of the object, the displacement of the cuboid 304-2 might be inaccurate. As shown, rather than enclosing a volume of the object 108 in the three-dimensional space of the image 106, the cuboid 304-2 in FIG. 3B is displaced to enclose a different volume. The displacement produces an error in the determined portion of the image 106 that includes the object 108.

Figure 4A:
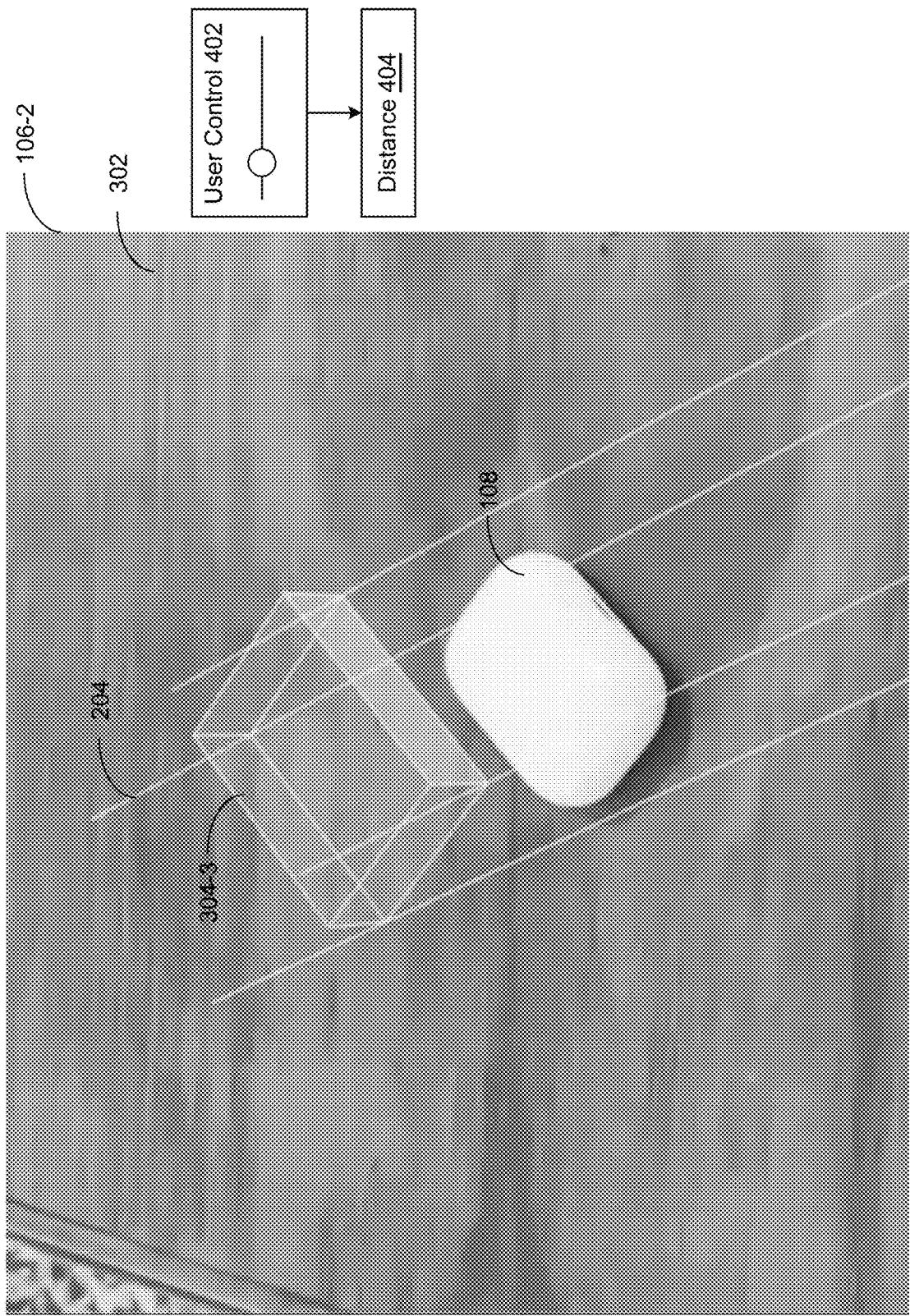
FIG. 4A-B are illustrations of a determination of one or more dimensions of an object in an image by the perspective correction engine of FIG. 1, according to one or more embodiments.
Figure 4B:
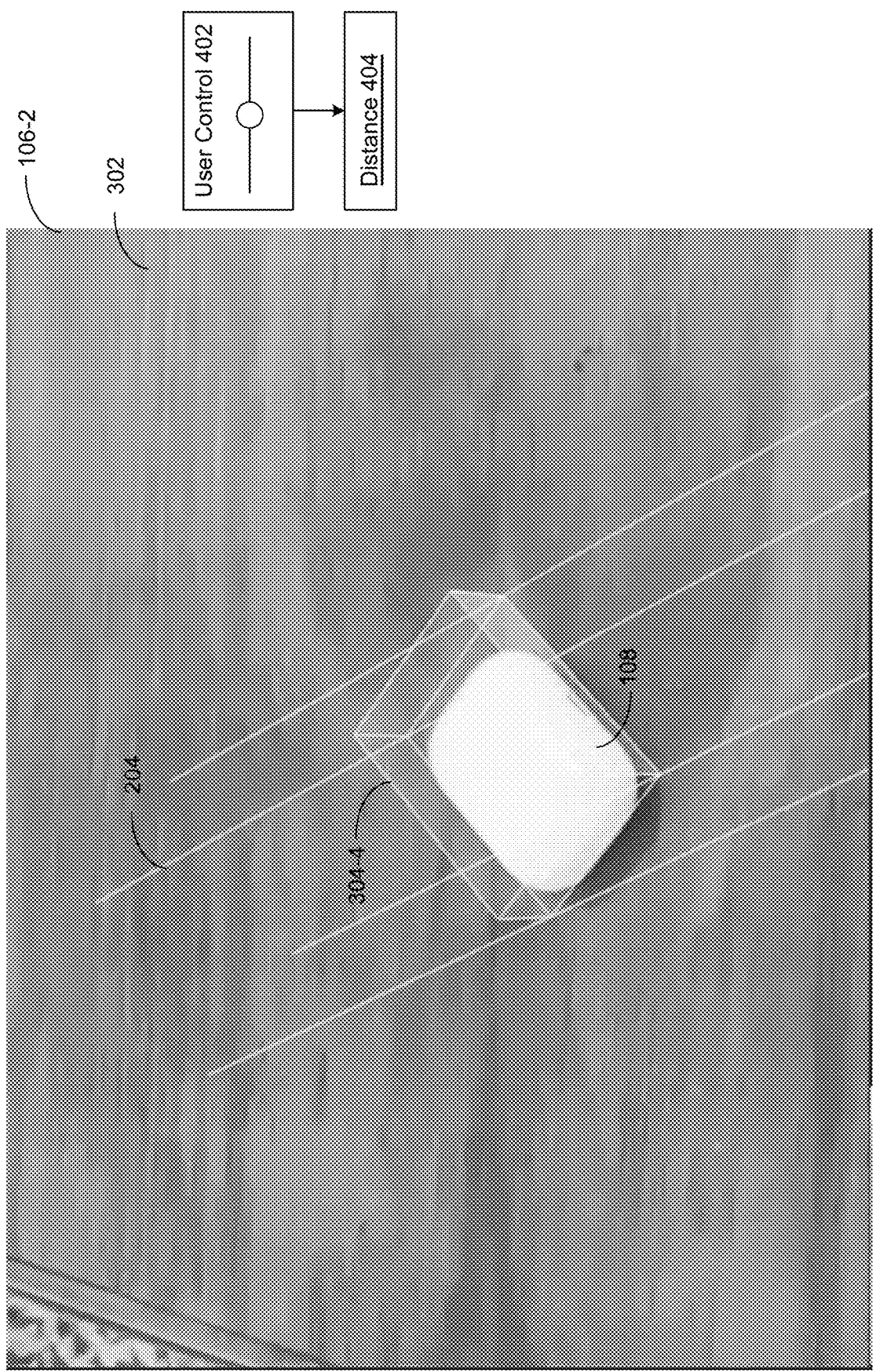

FIGS. 4A-B are illustrations of a determination of one or more dimensions 118 of an object 108 in an image 106-1 by the perspective correction engine 114 of FIG. 1, according to one or more embodiments. The perspective correction engine 114 determines the one or more dimensions 118 based on a location of the object 108 along an axis 204-1 of the image 106-1 as indicated based on another image 106-2 of the object 108 from a different perspective or point of view.

As shown, the graphical user interface 110 includes the same image 106-2 of the object 108 as shown in FIG. 3B. The graphical user interface 110 includes a user control 402 that receives user input 112 from a user. As shown, the user control 402 includes a slider that allows a user to indicate a distance 404 between the object 108 and the point of view 202. The perspective correction engine 114 translates the input distance to different locations 206 of the object 108 along an axis 204. In particular, the axis 204 shown in FIG. 4A corresponds to the axis 204 of the image 106-1 shown in FIG. 3A. As a result, different locations 206 along the axis 204 correspond to different candidate cuboids 304 in the image 106-2 shown in FIGS. 3B and 4A, which is from a different perspective or point of view 202. Candidate cuboids 304 are cuboids with different locations along the axis 204, while keeping the same projection from the point of view 202-1. Based on a distance 404 received by the user control 402, the perspective correction engine 114 can determine one or more dimensions 118 of the object 108. As shown, the perspective correction engine 114 receives a distance 404 through the user control 402. Based on the distance 404, the perspective correction engine 114 determines another one or more dimensions 118 of the object 108. The perspective correction engine 114 translates the cuboid 304-1 shown in FIG. 3A to a candidate cuboid 304-3 based on the determined one or more dimensions 118 of the object 108. The graphical user interface 110 shows the candidate cuboid 304-3 that corresponds to the selected distance 404 and the determined one or more dimensions 118 of the object 108. In FIG. 4A, the distance 404 indicated by the user control 402 does not match the actual location 206 of the object 108 along the axis 204. As a result, and as shown, the candidate cuboid 304-3 shown by the graphical user interface 110 does not enclose the object 108, due to the indicated distance 404 being incorrect. The depicted error can prompt the user to adjust the user control 402 in order to indicate a more accurate distance 404 of the object 108 in the image 106-1 from the point of view 202.

FIG. 4B is another illustration of a determination of one or more dimensions 118 of an object 108 in an image 106-2 by the perspective correction engine 114 of FIG. 1, according to one or more embodiments. The graphical user interface can receive user input 112 that indicates another location 206-2 of the object 108 along an axis 204.

As shown, the graphical user interface 110 includes the same image 106-2 of the object 108 as shown in FIGS. 3B and 4A. The graphical user interface 110 also includes the user control 402 that receives user input indicating another location 206-2 along the axis 204 of the image 106-1 of FIG. 3A. Based on the location 206-2, the perspective correction engine 114 determines another one or more dimensions 118 of the object 108. The perspective correction engine 114 translates the cuboid 304-1 shown in FIG. 3A to another candidate cuboid 304-4 based on the determined one or more dimensions 118 of the object 108. The graphical user interface 110 shows the candidate cuboid 304-4 that corresponds to the selected location 206-2 and the determined one or more dimensions 118 of the object 108. In FIG. 4B, the location 206-2 indicated by the user control 402 matches the actual location 206 of the object 108 along the axis 204. As a result, and as shown, the candidate cuboid 304-3 shown by the graphical user interface 110 encloses the object 108, due to the indicated distance 404 being correct.

In various embodiments, the graphical user interface 110 asks the user to verify that the candidate cuboid 304-4 encloses the object 108 in the image 106-2. If the user indicates that the candidate cuboid 304-4 encloses the object 108 in the image 106-2, the perspective correction engine 114 can determine that the received location 206-2 and one or more dimensions 118 are correct. If the user indicates that the candidate cuboid 304-4 does not enclose the object 108 in the image 106-2, the graphical user interface 110 can receive additional user input 112 from the user that further adjusts the location 206 and determines updated one or more dimensions 118 of the object 108.

FIGS. 4A and 4B show an example of a determination of one or more dimensions 118 of an object 108 by the perspective correction engine 114 of FIG. 1, in various embodiments. In other embodiments, the perspective correction engine 114 determines the one or more dimensions 118 in ways other than as shown in FIGS. 4A and 4B.

In various embodiments, instead of receiving user input 112 through a user control 402 that indicates a location 206 of the object 108 along the axis 204, the graphical user interface 110 can receive user input 112 as a selection of a location 206 within an image 106-2 from another perspective or point of view 202-2. For example, the graphical user interface 110 can receive a bounding shape of the object 108 in one image 106-1 and then present another image 106-2 that shows the object 108 from a different perspective or point of view 202. The graphical user interface 110 can receive, from the user, user input that indicates the location of the object 108 within the other image 106-2, such as a bounding shape or a coordinate along an axis 204-2 of the other image 106-2. The perspective correction engine 114 can determine the location 206 of the object 108 along an axis 204 of the image 106-1 based on the location selected in the other image 106-2. Alternatively or additionally, in various embodiments, the graphical user interface 110 can display the axis 204 of the image 106-1 within the other image 106-2. The graphical user interface 110 can receive, as user input, a selection of a coordinate within the other image 106-2 along the axis 204. The perspective correction engine 114 can determine the location 206 of the object 108 along the axis 204 that corresponds to the selected coordinate along the displayed axis 204 in the other image 106-2. Alternatively or additionally, in various embodiments, the perspective correction engine 114 can automatically determine a location 206 of the object 108 in an image 106-2. Based on the automatically determined location 206, automatically determine the location 206 of the object 108 in an image 106-2, the perspective correction engine 114 can automatically determine the location 206 of the object 108 along the axis 204-1 of another image 106-1.

In various embodiments, the perspective correction engine 114 can determine one or more dimensions 118 of an object 108 based on an image 106-1 and a location 206 of the object 108 in the image 106-1 based on another image 106-2. The one or more dimensions 118 can include one or more dimensions 118 of a portion of the object 108, such as a part of a device or machine. The one or more dimensions 118 can include one or more dimensions of a bounding shape that encloses the object 108, such as a cuboid. The one or more dimensions 118 can include one or more physical measurements, such as a length, width, height, radius, circumference, or the like. In various embodiments, the perspective correction engine 114 determines one or more dimensions 118 of the object 108 based on additional information, such as an orientation (e.g., one or more angles) of the axis 204-1 of the image 106-1; a location of the perspective or point of view 202-1 of the image 106-1; an orientation of the axis 204-2 of another image 106-2 that is used to determine the location 206 along the axis 204-1 of the image 106-1; and/or a location of the perspective or point of view 202-2 of the other image 106-2. In various embodiments, the perspective correction engine 114 receives and/or determines the additional information in relation to a physical reference point (e.d., one or more angles of a perspective or point of view 202 relative to an upward vertical axis) and/or in relation to other information (e.g., one or more angles of one perspective or point of view 202-1 relative to another perspective or point of view 202-2). In various embodiments, the perspective correction engine 114 receives the additional information from another device (e.g., a measurement by an inertial measurement unit concurrently with a captured image 106), from a user (e.d., via the graphical user interface 110), and/or by image analysis (e.g., by comparing reference points in an image 106-1 an another image 106-2 to determine a relative difference between the points of view 202-1, 202-2 of each image 106-1, 106-2).

Figure 5A:
FIG. 5A-B are illustrations of a perspective correction by the perspective correction engine of FIG. 1, according to one or more embodiments.
Figure 5B:
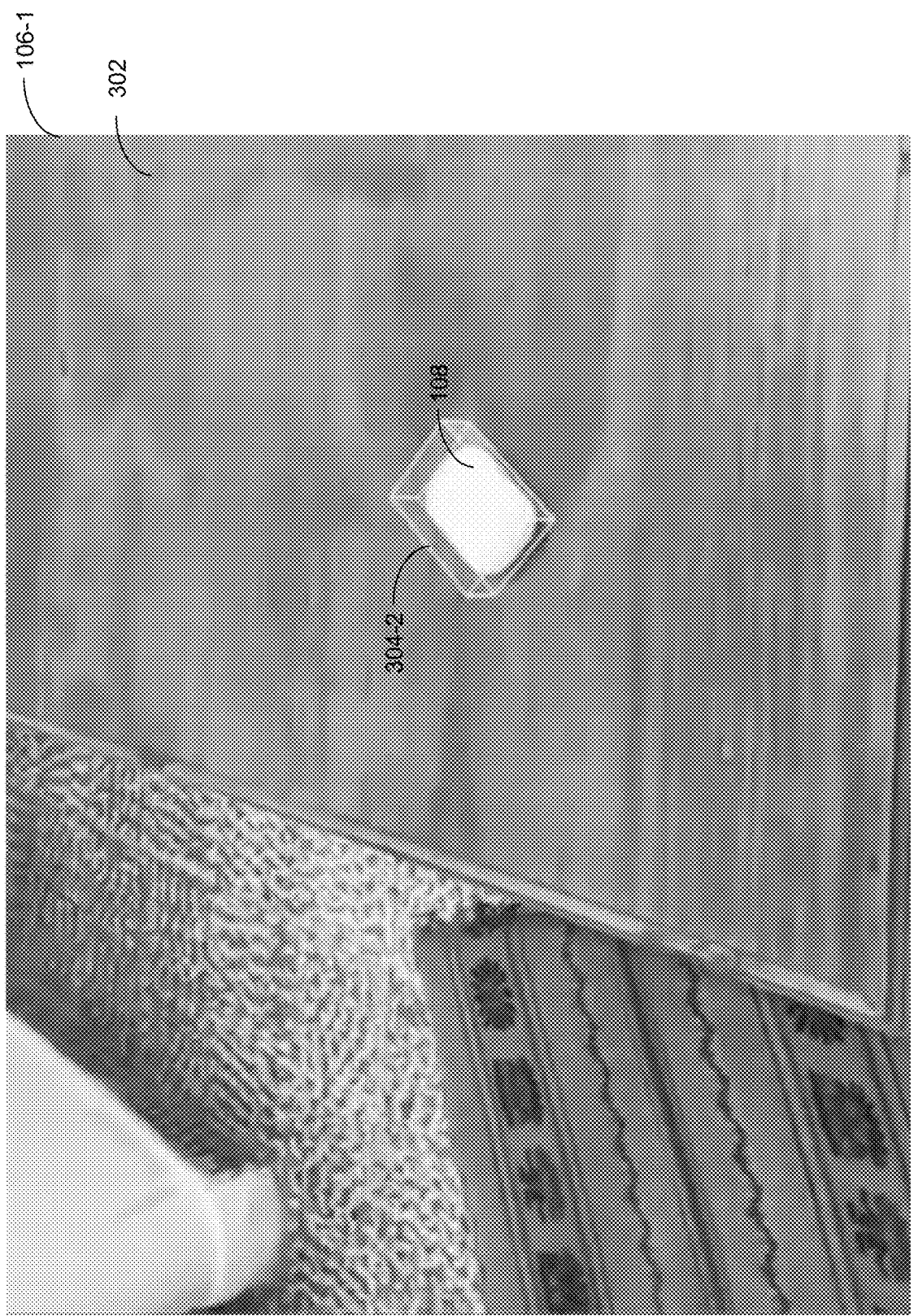

FIG. 5A-B are illustrations of a perspective correction of an image 106 of an object 108 by the perspective correction engine 114 of FIG. 1, according to one or more embodiments. As shown, based on one or more dimensions of an object 108 in the image 106-1 of FIG. 5A, the perspective correction engine 114 corrects a perspective of a cuboid in the image 106-2 of FIG. 5B.

As shown in FIG. 5A, the perspective correction engine 114 receives an image 106-1 including an object 108 in an environment, such as resting on a tabletop 302. The perspective correction engine 114 receives a cuboid 304-1 enclosing the object 108 in the image 106-1 (e.g., based on user input 112 received by a graphical user interface 110). The perspective correction engine 114 also receives a distance 404 of the object 108 from the point of view 202 (e.g., based on another image and a user control 402 presented in a user interface 110, such as discussed with regard to FIGS. 4A-4B). Based on the cuboid 304-1 and the location 206, the perspective correction engine 114 determines one or more dimensions 118 of the object 108.

As shown in FIG. 5B, the perspective correction engine 114 receives another image 106-2 including the object 108 from a different perspective or point of view 202. The perspective correction engine 114 adjusts the cuboid 304-1 of the image 106-1 of FIG. 5A based on a difference between the perspectives or points of view 202-1, 202-2 of the images 106-1, 106-2 (e.g., a lateral displacement and/or rotation of the point of view 202-2 of one image 106-2 relative to the point of view 202-1 of the other image 106-1). Based on the difference and the one or more dimensions 118 of the object 108, the perspective correction engine 114 can adjust a scale and/or orientation of the cuboid 304-1 of one image 106-1 to determine another cuboid 304-2 that matches the different perspective or point of view 202 of the other image 106-2.

Figure 6A:
FIGS. 6A-B are illustrations of another perspective correction by the perspective correction engine of FIG. 1, according to one or more embodiments.
Figure 6B:

FIGS. 6A-B are illustrations of another perspective correction of an image 106 of an object 108 by the perspective correction engine 114 of FIG. 1, according to one or more embodiments. As shown, based on one or more dimensions of an object 108 in the image 106-1 and a plane 602 of FIG. 6A, the perspective correction engine 114 corrects a perspective of a cuboid in the image 106-2 of FIG. 6B.

As shown in FIG. 6A, the perspective correction engine 114 receives an image 106-1 including an object 108 in an environment, such as resting on a tabletop 302. The perspective correction engine 114 receives a cuboid 304-1 enclosing the object 108 in the image 106-1 (e.g., based on user input 112 received by a graphical user interface 110). The perspective correction engine 114 also receives a distance 404 of the object 108 from the point of view 202 (e.d., based on another image and a user control 402 presented in a user interface 110, such as discussed with regard to FIGS. 4A-4B). Based on the cuboid 304-1 and the location 206, the perspective correction engine 114 determines one or more dimensions 118 of the object 108. The perspective correction engine 114 also receives an indication of a plane 602 of the image 106-1, such as a location and/or orientation of the surface of the tabletop 302. For example, the plane 602 can be indicated by a geometric plane, such as an orientation of the plane 602 with regard to an axis 204-1 of the image 106-1 and/or the object 108 and one or more points that are included in the plane 602. If the object 108 is resting on the plane 602, then the perspective correction engine 114 can determine the locations 206 of the object 108 in other images 106 of the object 108 based on the plane 602. As shown, if the object 108 is resting on the plane 602 defined by the surface of the tabletop 302, then the perspective correction engine 114 can correct bounding boxes surrounding the object 108 as the object 108 moves across the tabletop 302 based on a determination of corresponding locations on the plane 602.

As shown in FIG. 6B, the perspective correction engine 114 receives another image 106-2 including the object 108 from a different perspective or point of view 202. The other image 102-2 also shows the object 108 at another location 206-2 on the plane 602, such as another location 206-2 on the tabletop 302. The perspective correction engine 114 adjusts the cuboid 304-1 of the image 106-1 of FIG. 6A based on a difference between the perspectives or points of view 202-1, 202-2 of the images 106-1, 106-2 (e.d., a lateral displacement and/or rotation of the point of view 202-2 of one image 106-2 relative to the point of view 202-1 of the other image 106-1). The perspective correction engine 114 can also determine the location 206-2 of the object 108 in the image 106-2 based on the one or more dimensions 118. Based on the difference, the one or more dimensions 118 of the object 108, and the plane 602, the perspective correction engine 114 can adjust a scale and/or orientation of the cuboid 304-1 of one image 106-1 to determine another cuboid 304-2 that matches the different perspective or point of view 202 and the location 206-2 of the object 108 in the other image 106-2.

Figure 7A:
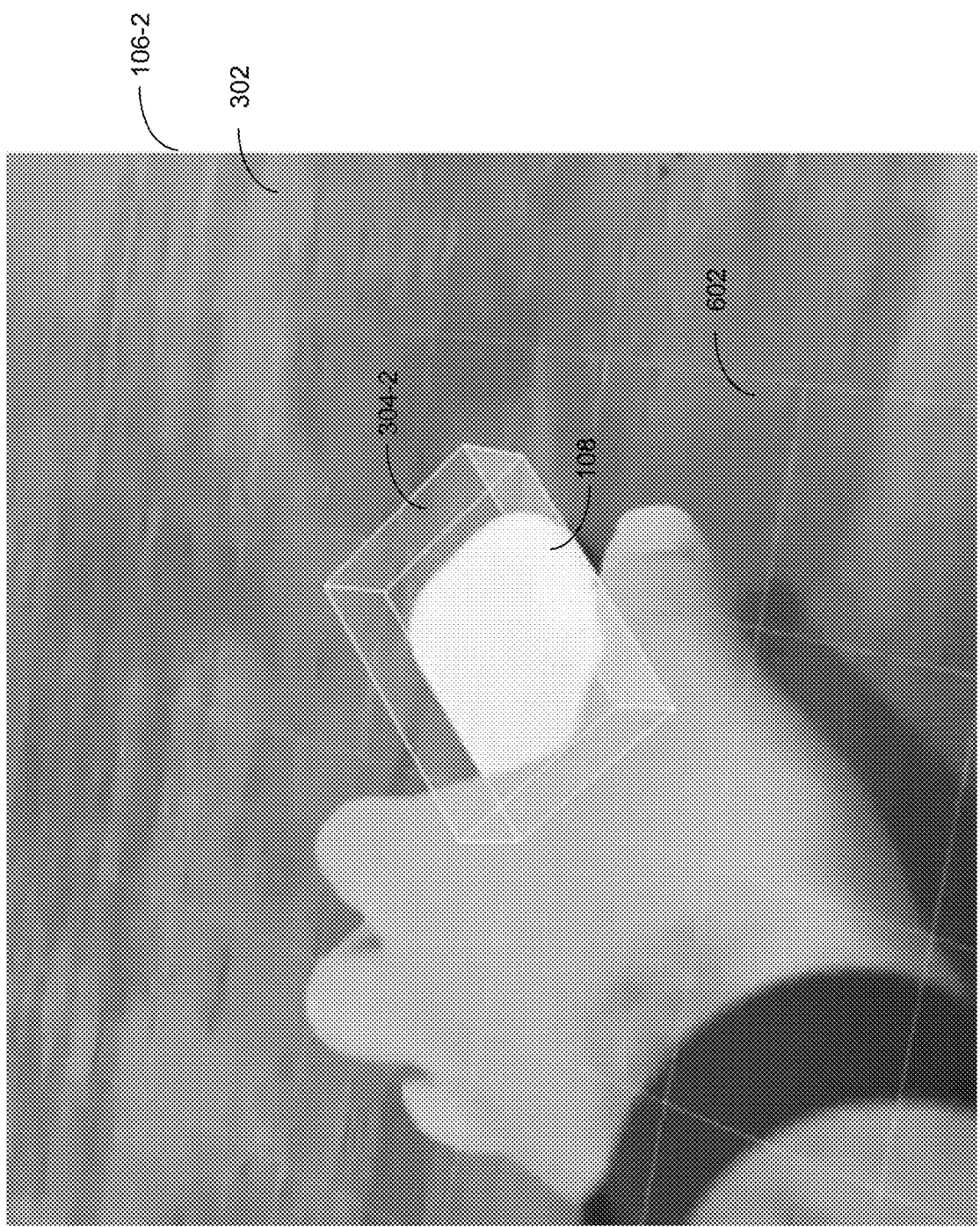
FIGS. 7A-C are illustrations of another perspective correction by the perspective correction engine of FIG. 1, according to one or more embodiments.
Figure 7B:
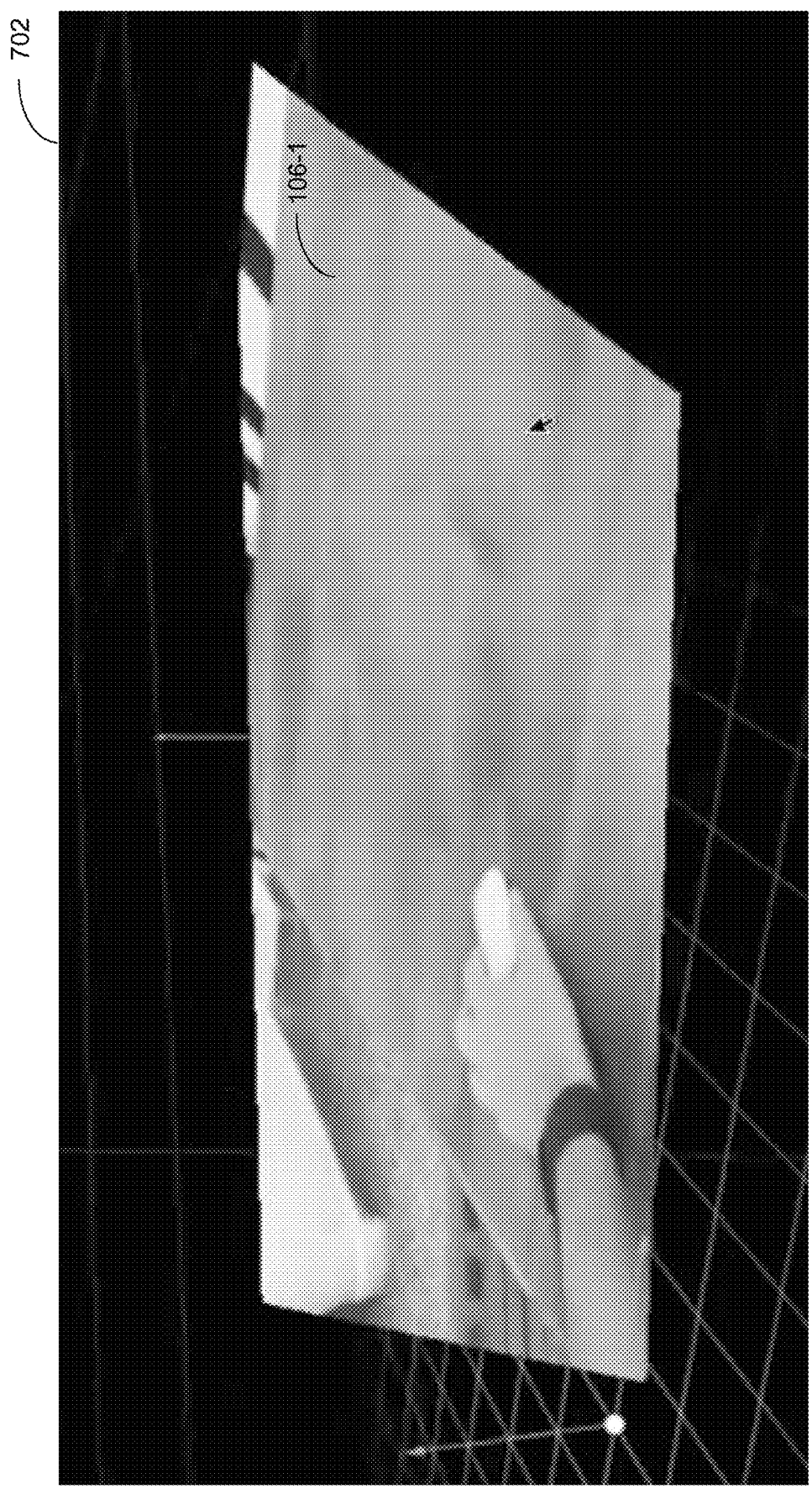
Figure 7C:
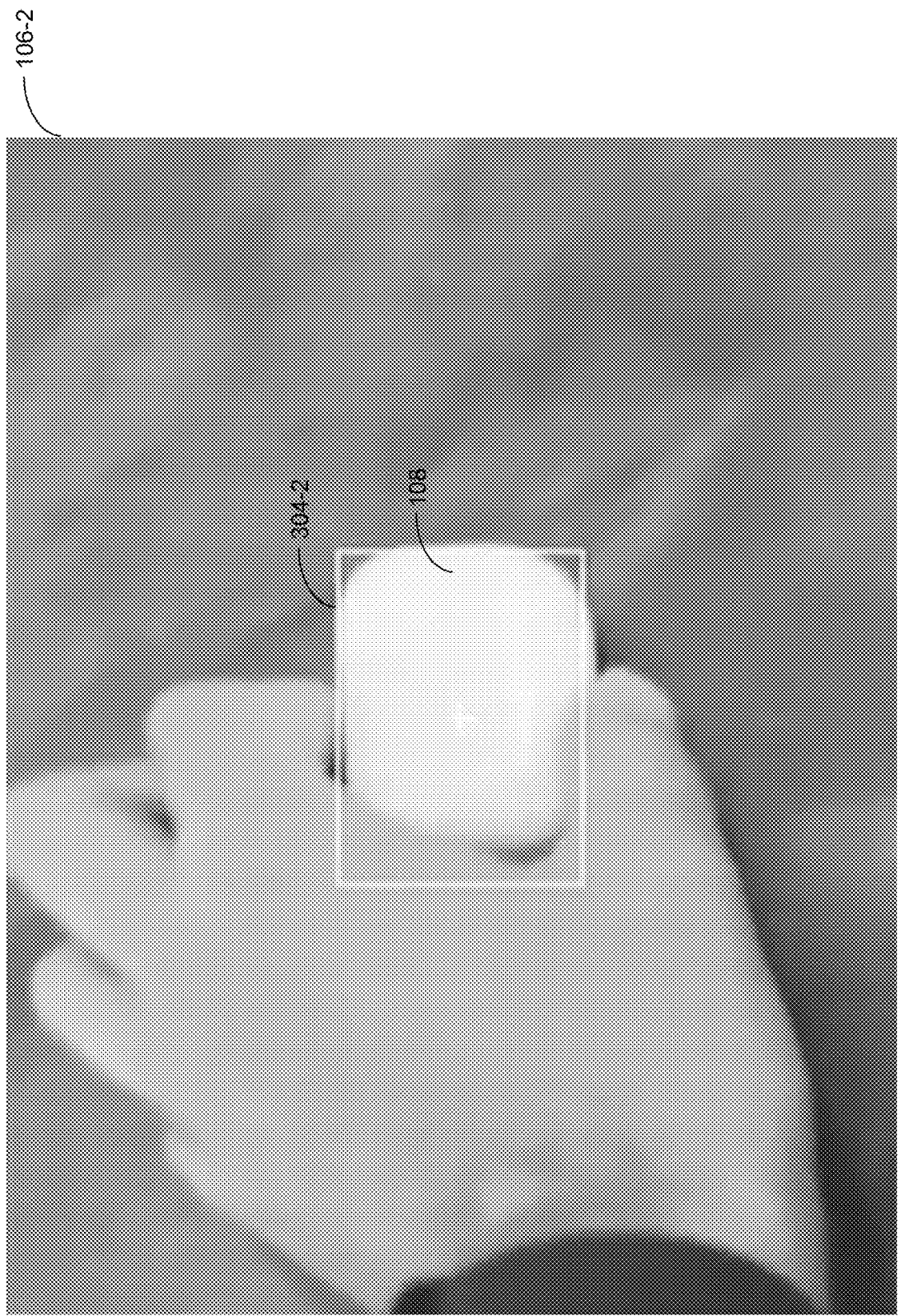

FIGS. 7A-C are illustrations of another perspective correction by the perspective correction engine 114 of FIG. 1, according to one or more embodiments. As shown, based on one or more dimensions of an object 108 in the image 106-1 of FIG. 7A, the perspective correction engine 114 skews at least a portion of the image 106-2 as shown in FIG. 7B to generate another image 106-2 from a different perspective or point of view 202 as shown in FIG. 7C.

As shown in FIG. 7A, the perspective correction engine 114 receives an image 106-1 including an object 108 in an environment, such as resting on a tabletop 302. The perspective correction engine 114 receives a cuboid 304-1 enclosing the object 108 in the image 106-1 (e.g., based on user input 112 received by a graphical user interface 110). The perspective correction engine 114 also receives a distance of the object 108 from the point of view 202 (e.g., based on another image and a user control 402 presented in a user interface 110, such as discussed with regard to FIGS. 4A-4B). Based on the cuboid 304-1 and the location 206, the perspective correction engine 114 determines one or more dimensions 118 of the object 108. The perspective correction engine 114 also receives an indication of a plane 602 of the image 106-1, such as a location and/or orientation of the surface of the tabletop 302. For example, the plane 602 can be indicated by a geometric plane, such as an orientation of the plane 602 with regard to an axis 204-1 of the image 106-1 and/or the object 108 and one or more points that are included in the plane 602. If the object 108 is resting on the plane 602, then the perspective correction engine 114 can determine the locations 206 of the object 108 in other images 106 of the object 108 based on the plane 602. As shown, if the object 108 is resting on the plane 602 defined by the surface of the tabletop 302, then the perspective correction engine 114 can correct other images 106-2 of the object 108 as it moves across the tabletop 302 based on a determination of corresponding locations on the plane 602.

As shown in FIG. 7B, the perspective correction engine 114 skews at least a portion of the image 106-1 according to a transformation matrix. In various embodiments, the transformation matrix is based on a mapping of the plane 602 determined with regard to the image 106-1. In various embodiments, the mapping associates each pixel of the image 106-1 with one or more pixels of the plane 602 when viewed from another perspective or point of view 202 along another axis, such as a perspective or point of view based on an axis that is normal to the plane 602. In various embodiments, the perspective correction engine 114 maps the image 106-1 to a two-dimensional plane that is normal to the axis 204-1 of the image 106-1 and then reorients the two-dimensional plane to match an orientation of the plane 602 determined in the image 106-1. Rendering the two-dimensional plane according to the reoriented perspective of the plane 602 determined in the image 106-1 causes at least a portion of the image 106-1 to be skewed to match a perspective or point of view 202 based on an axis that is normal to the plane 602 determined in the image 106-1. The perspective correction engine 114 generates a skewed rendering 702 of the image 106-1 that can show the object 108 from another perspective or point of view 202.

As shown in FIG. 7C, the perspective correction engine 114 generates another image 106-2 based on the skewing of at least a portion of the image 106-1 as shown in FIGS. 7A-B. The generated image 106-2 shows the object 108 from a perspective or point of view 202 based on an axis that is normal to the plane 602. That is, the generated image 106-2 shows an overhead view of the object 108 based on a skewing of the side view of the object 108 as shown in the original image 106-1. As shown, the perspective correction engine 114 also adjusts a cuboid 304-1 of the image 106-1 to generate an adjusted cuboid 304-2 that matches the perspective or point of view 202 of the generated image 106-2.

Figure 8:
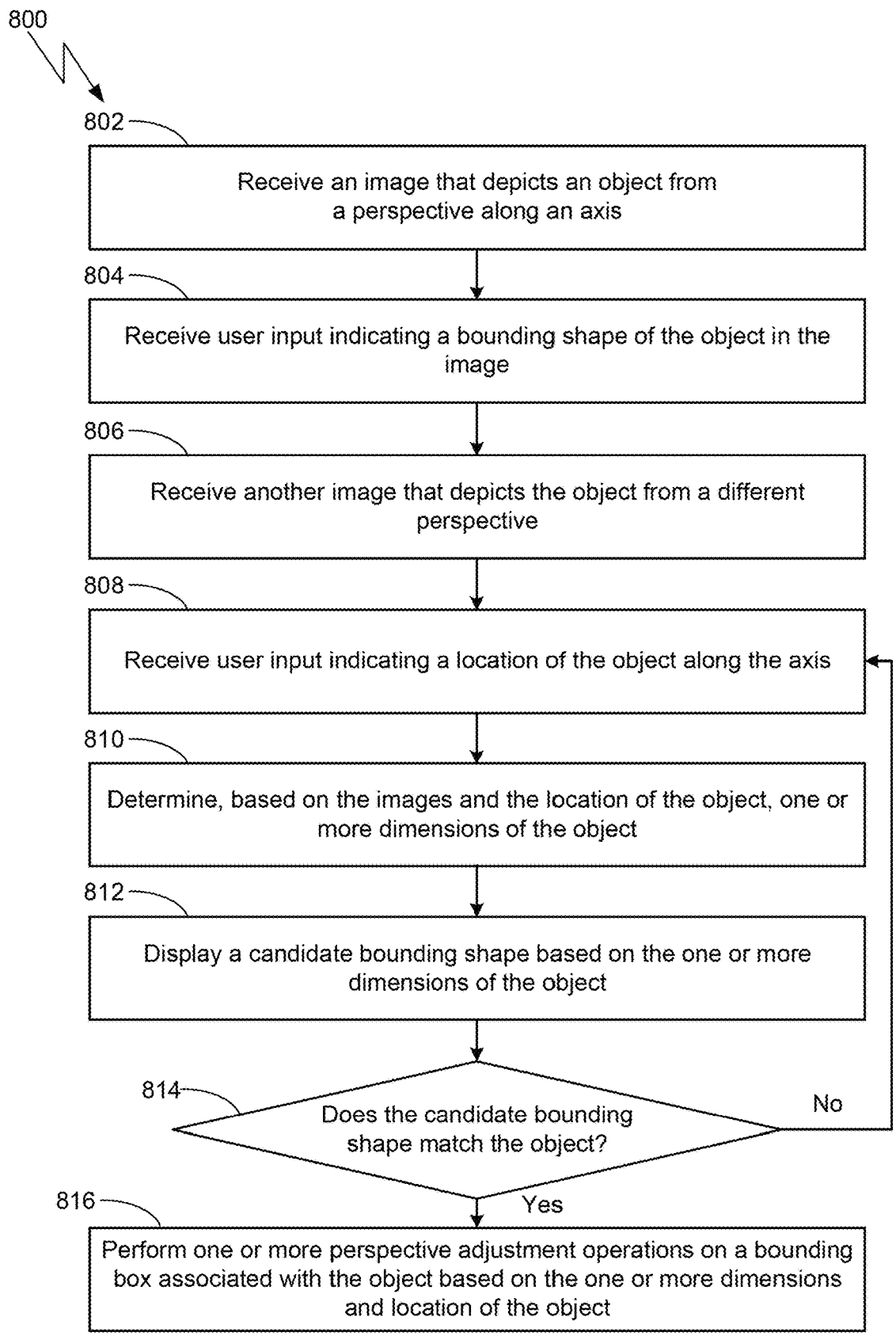
FIG. 8 is a flow diagram of method steps for correcting a perspective of an object in an image, according to one or more embodiments.

FIG. 8 is a flow diagram of method steps for correcting a perspective of an object in an image, according to one or more embodiments. The method steps could be performed, for example, by the perspective correction engine 114 of the server 101 of FIG. 1. Although the method steps are described with reference to FIG. 1, persons skilled in the art will understand that any system may be configured to implement the method steps, in any order, in other embodiments.

As shown, at step 802, the perspective correction engine receives an image that depicts an object from a perspective along an axis. In various embodiments, the image includes a still image captured by a camera or a frame of a video. The perspective correction engine can also receive additional information about the image, such as a location or orientation of the point of view 202. The perspective correction engine can show an image to a user in a graphical user interface including one or more user controls.

At step 804, the perspective correction engine receives, from a user, user input indicating a bounding shape of the object in the image. In various embodiments, the perspective correction engine receives the user input through one or more user controls provided in a graphical user interface. The bounding shape can include a two-dimensional shape, such as a rectangle, an oval, or a regular or irregular polygon, or a three-dimensional shape, such as a cuboid, a sphere, a cylinder, or a set of polygons.

At step 806, the perspective correction engine receives another image that depicts the object from a different perspective. In various embodiments, the image includes another still image captured by the camera from a different perspective, a still image captured by another camera from a different perspective, or another frame of the video. The perspective correction engine can also receive additional information about the image, such as a location or orientation of the perspective. The perspective correction engine can show the image to the user in a graphical user interface including one or more user controls.

At step 808, the perspective correction engine receives, from the user, user input indicating a location of the object along the axis. In various embodiments, the perspective correction engine receives the user input through one of the user controls provided in the graphical user interface, such as a slider with positions that correspond to different locations along the axis. The perspective correction engine can receive the user input as a selection of a point along the axis displayed in the other image.

At step 810, the perspective correction engine determines, based on the images and the location of the object along the axis, one or more dimensions of the object. In various embodiments, the perspective correction engine determines the one or more dimensions of a bounding shape of the object, such as a width, a length, or a height of a cuboid enclosing the object within the three-dimensional environment shown in the images.

At step 812, the perspective correction engine displays a candidate bounding shape based on the one or more dimensions of the object. In various embodiments, the perspective correction engine generates the candidate bounding shape based on the received bounding shape and one or more dimensions of the object based on the location. The perspective correction engine can adjust a size, location, and/or orientation of a cuboid that encloses the object in one or both of the images to generate the candidate bounding shape.

At step 814, the perspective correction engine determines whether the candidate bounding shape encloses the object. In various embodiments, the perspective correction engine displays the candidate bounding shape in one or both of the images 106 and asks the user to verify that the candidate bounding shape encloses the object in one or both of the images. If not, the method returns to step 808 to receive additional user input. If so, the method proceeds to step 816.

At step 816, the perspective correction engine performs one or more perspective adjustment operations associated with the object. In various embodiments, the perspective correction engine adjusts a bounding shape enclosing the object in an image based on the determined one or more dimensions of the object and a location of the object. The perspective correction engine can adjust a bounding shape enclosing the object in another image in which the object has moved to a different location on a plane. The perspective correction engine can skew an image to generate another image that depicts the object from another perspective, such as a perspective based on an axis that is normal to a plane on which the object is resting.

In sum, techniques are disclosed for three-dimensional perspective correction. A perspective correction engine receives a first image that depicts an object from a first perspective along a first axis. The perspective correction engine determines a location of the object along the first axis. The determination of the location provides depth information relative to a perspective of the object as shown from the perspective of the first perspective along the first axis. The perspective correction engine determines, based on the first image and the location of the object along the first axis, at least one dimension of the object. The at least one dimension of the object combines the visual information in the image and the depth information to generate accurate information about the object. The perspective correction engine adjusts, based on the at least one dimension of the object, a second image that depicts the object from a second perspective along a second axis. Adjusting the second image corrects the image of the object as shown from the perspective of the object along the second axis based on the information determined about the object from the first image and the depth information.

At least one technical advantage of the disclosed techniques is an improved accuracy of information determined about the object in the first image, such as one or more dimensions of the object and/or a bounding shape of the object. The accuracy of determined information about the object can improve the accuracy of additional operations performed on images of the object, such as determining the location and/or bounding shape of the object in additional images along different axes. As another technical advantage, the techniques can adjust a bounding shape that encloses an object in one image to another image from a different perspective or point of view. As a result, locations of a moving object can be accurately determined over multiple images that depict the object at different locations. As another technical advantage, the techniques enable new types of operations on images of an object that might otherwise be difficult to perform with acceptable results. For example, given an image that shows a lateral view of an object and an indication of a distance of the object from the viewing location, the techniques can generate a new image that depicts an overhead view of the object. These technical advantages provide one or more technological improvements over prior art approaches.

1. In various embodiments, a computer-implemented method comprises receiving a first image that depicts an object from a first perspective along a first axis, determining a location of the object along the first axis, determining, based on the first image and the location of the object along the first axis, at least one dimension of the object, and performing, based on at least one dimension of the object, one or more perspective adjustment operations on a second image that depicts the object from a second perspective along a second axis.

2. The computer-implemented method of clause 1, where determining the location of the object comprises determining at least one dimension of a bounding shape of the object in the first image.

3. The computer-implemented method of clause 1 or 2, further comprising displaying at least one candidate bounding shape of the object in the first image, wherein each candidate bounding shape is based on a different location of the object along an axis, and receiving user input that indicates a candidate bounding shape of the object, wherein the location of the object is determined based on the candidate bounding shape indicated by the user input.

4. The computer-implemented method of any of clauses 1-3, further comprising receiving user input that indicates the location of the object along the first axis, and displaying a bounding shape of the object within the first image based on the location of the object along the first axis.

5. The computer-implemented method of any of clauses 1-4, further comprising determining a location of the object in the second image based on a plane that includes the object in the first image.
6. The computer-implemented method of any of clauses 1-5, where a first perspective adjustment operation comprises adjusting a size of the object in the second image based on the at least one dimension of the object and a location of the object along the second axis.
7. The computer-implemented method of any of clauses 1-6, further comprising generating a bounding shape of the object in the second image based on the at least one dimension of the object and a location of the object along the second axis.
8. The computer-implemented method of any of clauses 1-7, where a first perspective adjustment operation comprises determining at least one dimension of a bounding shape of the object in the second image based on the at least one dimension of the object and a location of the object along the second axis.
9. The computer-implemented method of any of clauses 1-8, further comprising receiving a user input indicating a location of the object along the second axis, and displaying a bounding shape of the object within the second image based on the location of the object along the second axis.
10. The computer-implemented method of any of clauses 1-9, where a first perspective adjustment operation comprises skewing at least a portion of the second image to depict the object from a third perspective along a third axis.
11. In various embodiments, one or more non-transitory computer-readable media storing instructions that, when executed by one or more processors, cause the one or more processors to perform the steps of receiving a first image that depicts an object from a first perspective along a first axis, determining a location of the object along the first axis, determining, based on the first image and the location of the object along the first axis, at least one dimension of the object, and performing, based on at least one dimension of the object, one or more perspective adjustment operations on a second image that depicts the object from a second perspective along a second axis.
12. The one or more non-transitory computer-readable media of clause 11, where determining the location of the object comprises determining at least one dimension of a bounding shape of the object in the first image.
13. The one or more non-transitory computer-readable media of clause 11 or 12, further comprising displaying at least one candidate bounding shape of the object in the first image, where each candidate bounding shape is based on a different location of the object along an axis, and receiving user input that indicates a selected candidate bounding shape of the object, wherein the location of the object is determined based on the selected candidate bounding shape.
14. The one or more non-transitory computer-readable media of any of clauses 11-13, further comprising receiving user input that indicates the location of the object along the first axis, and displaying a bounding shape of the object within the first image based on the location of the object along the first axis.
15. The one or more non-transitory computer-readable media of any of clauses 11-14, where a first perspective adjustment operation comprises adjusting a size of the object in the second image based on the at least one dimension of the object and a location of the object along the second axis.
16. The one or more non-transitory computer-readable media of any of clauses 11-15, further comprising displaying a bounding shape of the object in the second image based on the at least one dimension of the object and a location of the object along the second axis.
17. The one or more non-transitory computer-readable media of any of clauses 11-16, where a first perspective adjustment operation comprises determining at least one dimension of a bounding shape of the object in the second image based on the at least one dimension of the object and a location of the object along the second axis.
18. The one or more non-transitory computer-readable media of any of clauses 11-17, where a first perspective adjustment operation comprises skewing at least a portion of the second image to depict the object from a third perspective along a third axis.
19. In various embodiments a system comprises a memory that stores instructions, and a processor that is coupled to the memory and, when executing the instructions, is configured to perform the steps of receiving a first image that depicts an object from a first perspective along a first axis, determining a location of the object along the first axis, determining, based on the first image and the location of the object along the first axis, at least one dimension of the object, and performing, based on at least one dimension of the object, one or more perspective adjustment operations on a second image that depicts the object from a second perspective along a second axis.
20. The system of clause 19, where a first perspective adjustment operation comprises skewing at least a portion of the second image to depict the object from a third perspective along a third axis.

Any and all combinations of any of the claim elements recited in any of the claims and/or any elements described in this application, in any fashion, fall within the contemplated scope of the present invention and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module," a "system," or a "computer." In addition, any hardware and/or software technique, process, function, component, engine, module, or system described in the present disclosure may be implemented as a circuit or set of circuits. Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method, comprising:
    receiving a first image that depicts an object from a first perspective along a first axis;
    determining a location of the object along the first axis;
    determining, based on the first image and the location of the object along the first axis, at least one logical dimension of the object;
    receiving a second image that depicts the object from a second perspective along a second axis;
    generating a movable bounding shape within the second image based on the location of the object along the first axis and the at least one logical dimension;
    receiving one or more modifications to a location of the movable bounding shape within the second image;
    determining, based on the first image, the location of the object along the first axis, and the one or more modifications, at least one dimension of the object; and
    performing, based on at least one dimension of the object, one or more perspective adjustment operations on a third image that depicts the object from a third perspective.

2. The computer-implemented method of claim 1, wherein determining the location of the object comprises determining at least one dimension of a bounding shape of the object in the first image.

3. The computer-implemented method of claim 2, further comprising:
    displaying at least one candidate bounding shape of the object in the first image, wherein each candidate bounding shape is based on a different location of the object along an axis; and
    receiving user input that indicates a candidate bounding shape of the object, wherein the location of the object is determined based on the candidate bounding shape indicated by the user input.

4. The computer-implemented method of claim 2, further comprising:
    receiving user input that indicates the location of the object along the first axis; and
    displaying a bounding shape of the object within the first image based on the location of the object along the first axis.

5. The computer-implemented method of claim 1, further comprising determining a location of the object in the third image based on a plane that includes the object in the first image.

6. The computer-implemented method of claim 1, wherein a first perspective adjustment operation comprises adjusting a size of the object in the third image based on the at least one dimension of the object and a location of the object along a third axis.

7. The computer-implemented method of claim 1, wherein a first perspective adjustment operation comprises skewing at least a portion of the third image to depict the object from a fourth perspective along a third axis.

8. One or more non-transitory computer-readable media storing instructions that, when executed by one or more processors, cause the one or more processors to perform the steps of:
    receiving a first image that depicts an object from a first perspective along a first axis;
    determining a location of the object along the first axis;
    determining, based on the first image and the location of the object along the first axis, at least one logical dimension of the object;
    receiving a second image that depicts the object from a second perspective along a second axis;
    generating a movable bounding shape within the second image based on the location of the object along the first axis and the at least one logical dimension;

receiving one or more modifications to a location of the movable bounding shape within the second image;

determining, based on the first image, the location of the object along the first axis, and the one or more modifications, at least one dimension of the object; and performing, based on at least one dimension of the object, one or more perspective adjustment operations on a third image that depicts the object from a third perspective.

9. The one or more non-transitory computer-readable media of claim 8, wherein determining the location of the object comprises determining at least one dimension of a bounding shape of the object in the first image.

10. The one or more non-transitory computer-readable media of claim 9, further comprising:

displaying at least one candidate bounding shape of the object in the first image, wherein each candidate bounding shape is based on a different location of the object along an axis; and receiving user input that indicates a selected candidate bounding shape of the object, wherein the location of the object is determined based on the selected candidate bounding shape.

11. The one or more non-transitory computer-readable media of claim 9, further comprising:

receiving user input that indicates the location of the object along the first axis; and displaying a bounding shape of the object within the first image based on the location of the object along the first axis.

12. The one or more non-transitory computer-readable media of claim 8, wherein a first perspective adjustment operation comprises adjusting a size of the object in the third image based on the at least one dimension of the object and a location of the object along a third axis.

13. The one or more non-transitory computer-readable media of claim 8, wherein a first perspective adjustment operation comprises skewing at least a portion of the third image to depict the object from a third perspective along a third axis.

14. A system, comprising:

a memory that stores instructions, and a processor that is coupled to the memory and, when executing the instructions, is configured to perform the steps of:

receiving a first image that depicts an object from a first perspective along a first axis;

determining a location of the object along the first axis;

determining, based on the first image and the location of the object along the first axis, at least one logical dimension of the object;

receiving a second image that depicts the object from a second perspective along a second axis;

generating a movable bounding shape within the second image based on the location of the object along the first axis and the at least one logical dimension;

receiving one or more modifications to a location of the movable bounding shape within the second image;

determining, based on the first image, the location of the object along the first axis, and the one or more modifications, at least one dimension of the object; and performing, based on at least one dimension of the object, one or more perspective adjustment operations on a third image that depicts the object from a third perspective.

15. The system of claim 14, wherein a first perspective adjustment operation comprises skewing at least a portion of the third image to depict the object from the third perspective along a third axis.

* * * * *